Aug. 13, 1935.  F. C. JACOBS  2,011,408
METHOD OF INSPECTING TURBINE BLADES
Filed Feb. 5, 1935  2 Sheets-Sheet 1
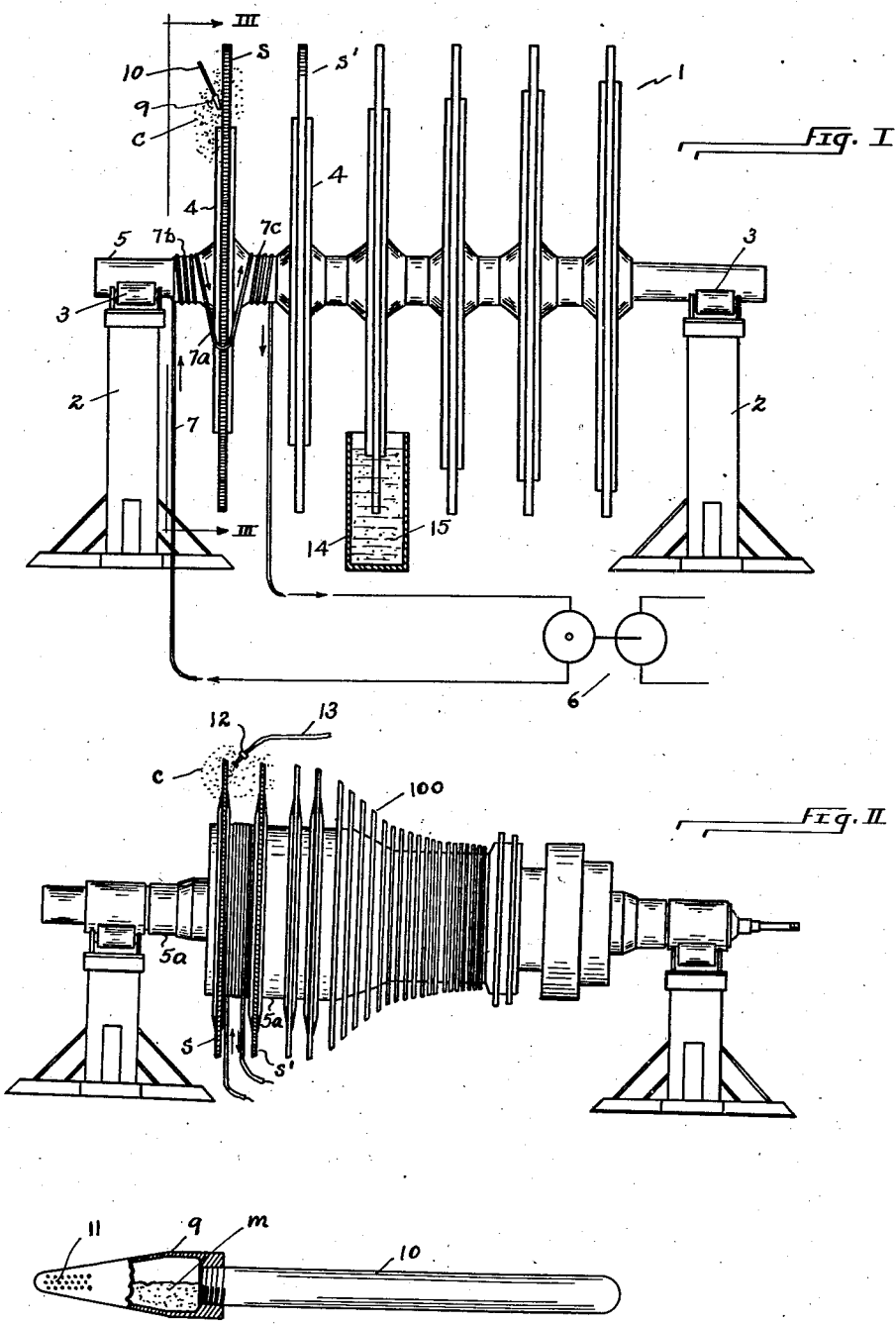
INVENTOR
Frank C. Jacobs
by Christy and Wharton
his attorneys Aug. 13, 1935.  F. C. JACOBS  2,011,408
METHOD OF INSPECTING TURBINE BLADES
Filed Feb. 5, 1935  2 Sheets—Sheet 2
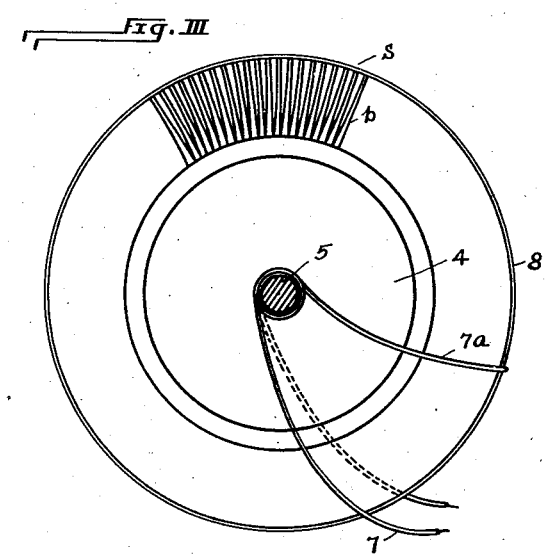
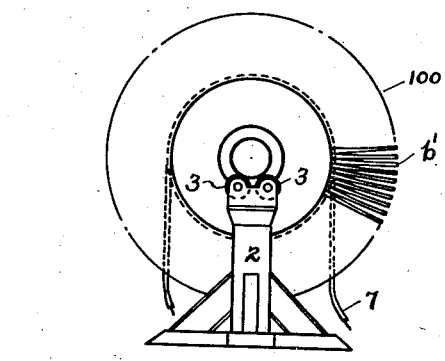
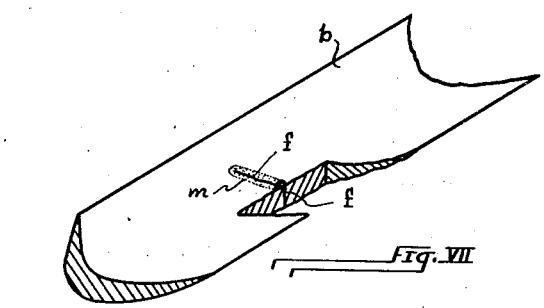
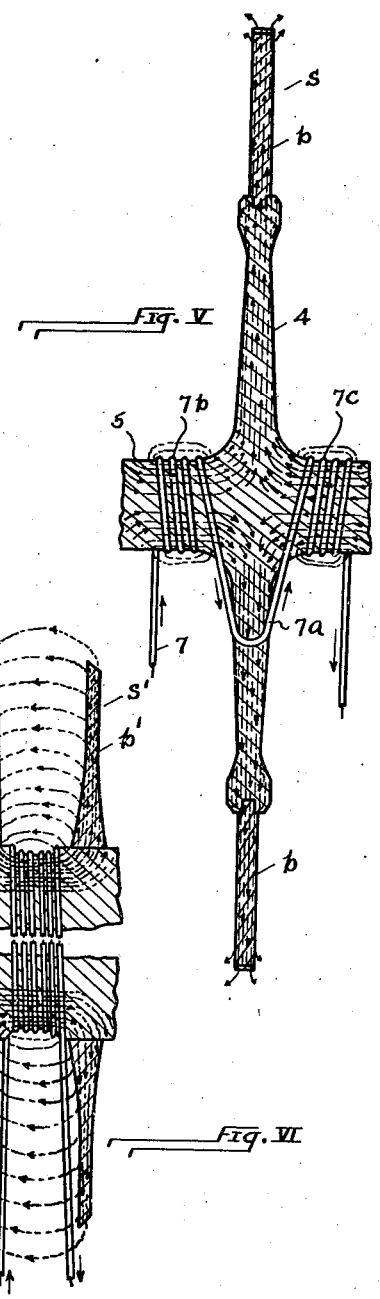
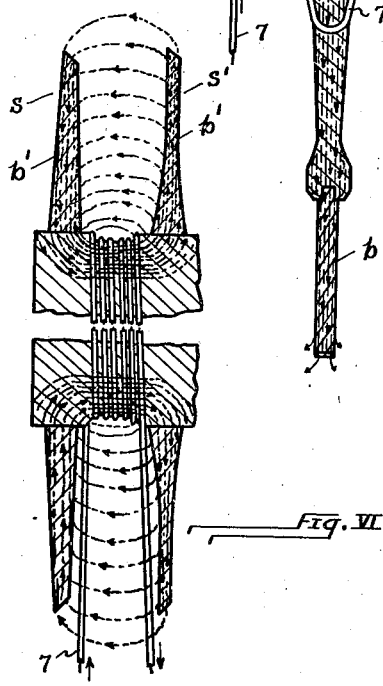
INVENTOR
Frank C. Jacobs
by Christy and Wharton
his attorneys Patented Aug. 13, 1935

2,011,408

UNITED STATES PATENT OFFICE 2,011,408

METHOD OF INSPECTING TURBINE BLADES

Frank C. Jacobs, New Kensington, Pa.

Application February 5, 1935, Serial No. 5,083

7 Claims. (Cl. 175—183)

My invention relates to the inspection of turbine blades, particularly the blades of steam turbines, and consists both in method and in apparatus.

In a steam turbine the clearances between the rotor blades and the vanes of the stator are exceedingly small, and the speed of the rotor is very high. Accordingly, if a blade breaks while the turbine is in operation, great damage is done before the machine can be brought to rest. In the case of large turbines, such as are used in power plants and in ocean-going vessels, the damage resulting from such blade failure usually entails a loss of thousands of dollars. And it is chiefly for this reason that turbines are taken out of service from time to time, and their blades inspected.

One of the most difficult problems encountered in making a turbine inspection is to detect the presence of minute flaws or fissures that frequently develop in the blades of the rotor.

The inspection methods employed hitherto consist in carefully examining the exposed surfaces of the blades. The men are trained for the work, and, from experience, they know the surface regions of the blades where cracks are most likely to develop. These regions are more or less characteristic, depending on blade material, blade contour, and the axial location of the blades on the spindle. Accordingly, the attention of the inspector is concentrated on these points of greatest vulnerability.

Reading glasses, magnifying lenses, special lights, reflectors, periscopes, and other means have been used to aid in detecting minute blade fractures, many of which are invisible to the naked eye. However, in using these expedients a painstaking search of the entire exposed surfaces of the blades must be made, and at best such expedients are of value in detecting only those fractures that appear or exist in the surfaces of the blades. Due to the inadequacies of the equipment employed, and the physical limitations imposed by the human element, the results of inspection have never proved certain. While the inspector would find cracked blades and have them replaced, there was no assurance that some microscopic or internal defect had not been overlooked, nor that sooner or later such defect would not become so aggravated as to cause blade failure.

Many years ago it was discovered that the presence of flaws, cracks, discontinuities, or strains in a body of iron, steel or other paramagnetic material tends to produce a very pronounced distortion in lines of magnetic flux set up in such body, and that iron particles, or other comminuted paramagnetic material, sprinkled upon the surface of the body, tend to segregate or concentrate over the regions of the body where such discontinuities or other defects exist.

I have found that in order for magnetic testing to be effective in commercial application, it is essential that the magnetic flux be of reltively great density in the body of magnetic material to be inspected. Additionally, it appears that in cases in which the defect comprises a microscopic crack or fissure the lines of magnetic flux must extend angularly to the plane of that deflect—otherwise an effective distortion of the lines of flux is not produced. In other words, if the lines of magnetic flux run parallel to the plane of a minute fracture of the sort that usually develops in a turbine blade, no readily apparent concentration of the magnetic test particles may be obtained.

It has been noted that the cracks or fissures developing in a turbine blade usually extend transversely of the major axis of the blade, and I have found that, by setting up in the blade magnetic flux directed on lines extending radially of the turbine rotor, the application of magnetic testing becomes practical under the conditions existing in the field. No high degree of skill is required, and the results are positive and accurate.

It will be understood that a large turbine rotor carries upwards of six thousand radially extending blades, and my invention consists in the discovery of how magnetic testing may be effectively and readily conducted upon a structure of this sort.

In the accompanying drawings Figs. I and II severally show in side elevation two turbine rotors of well-known types; the rotors are shown "blocked up," ready for inspection. Fig. III is a sectional view, taken on the plane III—III of Fig. I. Fig. IV is a view in end elevation of the rotor shown in Fig. II. Fig. V is a fragmentary view, showing to larger scale, and in vertical section, one stage of blades of the rotor shown in Fig. I; and Fig. VI is a similar view of two adjoining stages of blades of the rotor shown in Fig. II. Fig. VII is a fragmentary view of a blade, illustrating partly in section and partly in elevation a typical blade fracture. Fig. VIII is a view, partly in longitudinal section and partly in elevation, of an applicator for the magnetic testing material.

Referring to Fig. I of the drawings, a turbine rotor 1 is shown removed from assembly with its stator, and rotatably supported, ready for inspection. Conveniently, a pair of standards 2, equipped with antifriction bearings 3, affords the desired support.

A turbine rotor comprises a spindle carrying one or more stages or annular groups of radiating blades, and characteristically the structure is built of ferrous metal which is susceptible of magnetization. The rotor 1 is a six stage Curtis type rotor; its spindle 5 is of relatively small diameter, and each group or stage of its blades $b$ is carried by a disk or wheel 4 integral with the spindle; and it will be understood (cf. Fig. III) that the blades of each stage are located a relatively great radial distance from the spindle.

In proceeding in accordance with the invention, I wind a length of electric cable 7 about the spindle 5 on each side of the stage $s$ of blades, and then I produce a flow of D. C. current in the cable. As shown in Fig. I, a motor generator 6 may supply the current. It is important to note that on opposite sides of the stage $s$ of blades the cable 7 is wound in opposite directions about the spindle 5, and that the two oppositely wound coils 7b and 7c are interconnected by a loop 7a loosely draped over the usual shrouding 8 (Fig. III), by means of which the assembly of blades $b$ is circumferentially reinforced. The D. C. current flowing through the cable creates lines of magnetic force extending axially of the spindle 5, and, as indicated by the arrows in Fig. V, the particular winding of the cable causes the lines of force, generated by the flowing current, to act in opposition. As the arrows further indicate in Fig. V, these lines of magnetic force produce a concentration of magnetic flux in the disk 4 and blades $b$, and the lines of such magnetic flux extend radially of the spindle 5.

In a Curtis type rotor having a spindle of one-foot diameter and a maximum blade group diameter of six feet, I provide four turns of cable in each of the opposed coils 7b, 7c, and through the cable 7, I feed 110 amperes of current under a potential of 20 volts. Thereby, I obtain an effective magnetization of all blades in the particular group ($s$) of blades under immediate consideration.

While the blades are so magnetized, I apply magnetic testing material to their surfaces, and in known way any flaw or crack existing in an individual blade is revealed by a segregation or concentration of the testing material upon the surface of that blade. Fig. VII shows a flaw $f$ in a blade $b$, and the dotted lines $m$ illustrate roughly how the magnetic testing material accumulates or segregates. The defect itself may be invisible, but the segregation of testing material is readily apparent to the inspector.

The magnetic testing material may be a paramagnetic or diamagnetic substance in mobile state. A paramagnetic liquid (such as a nickel sulphate solution) may be used as the testing material; alternately, the testing material may comprise a liquid carrying powdered magnetic material (kerosene carrying ferric oxide is an example); and again powdered or comminuted paramagnetic material in dry condition may be used. Powdered ferric oxide or rouge serves well, but I prefer to employ powdered magnetic iron.

Advantageously, I provide an applicator, as shown in Fig. VIII; the applicator comprises a hollow head 9 and a handle 10; the handle is removable, and the powdered testing material is introduced to the head through the opening that normally receives the handle. The head 9 is perforate, as indicated at 11, and by agitating the applicator, such as by tapping it against the blades $b$ being inspected, I dust the testing material upon the surfaces of the blades.

Advantageously, by agitating the applicator, as described above, I produce a dispersion or cloud $c$ of the testing material adjacent the stage of blades being inspected, and, by rotating the rotor, I move the blades $b$ successively through such cloud. The rotation may be effected by hand, and it may be a continuous, slow rotation, or it may be an intermittent rotation. Thus, all the blades of group $s$ are moved successively through the cloud $c$, and become coated with testing powder, whereby, by observing the distribution of the powder on individual blades, the presence of defects may be readily discovered.

When group $s$ of blades has thus been inspected, I remove the cable 7, and apply it to the spindle 5 on opposite sides of the second group $s'$ of blades. The testing procedure is continued in the above described manner, until all blades of the rotor have been inspected.

Figs. II and IV illustrate a rotor 100 of a Parsons turbine. Characteristically the spindle 5a of such a rotor is of relatively large diameter in the portion that carries the blades, and I have found that six turns of cable about a spindle of four feet maximum diameter are effective, when 110 amperes of current are flowing in the cable, in producing an adequate concentration of radial lines of magnetic flux in blades two feet in length. Indeed, six turns of current-conducting cable 7 applied (as shown in Fig. II) between two groups $s$ and $s'$ of such blades are effective in magnetizing all blades in the two stages. The arrows in Fig. VI illustrate the radial lines of magnetic flux set up in the two adjoining groups $s$, $s'$ of blades $b'$.

I apply the powdered magnetic testing material to the magnetized blades $b'$ in the manner already described in connection with the rotor of Fig. I. And so the successive stages of blades of the rotor 100 may be magnetized, dusted with testing material, and inspected for flaws.

It is contemplated that the dispersion $c$ of testing material, through which the magnetized blades are successively moved, may be produced by an air blast. That is to say, air under pressure, carrying the testing powder in suspension, may, by means of instrumentalities with which the engineer is familiar, be fed through a supply line 13 (Fig. II), and directed by a nozzle 12 against the blades. Alternately, a liquid testing material, or a liquid carrying testing material in suspension (or solution), may be fed pneumatically through the line 13, and ejected in atomized condition by the nozzle 12, to provide the desired dispersion of testing material.

In still another modification, I provide a tank 14 (Fig. I) adapted to confine a liquid bath 15, and the lower blades of the annular group being inspected are immersed in such bath. The liquid of the bath carries the magnetic testing material in suspension (or solution), and provides a dispersion of testing material through which, by rotating the rotor, the blades of the group may be successively passed. In practicing the latter modification, however, I have found that the liquid tends to run and drip from the surfaces of the blades leaving the bath, and to some extent disturbs significant segregation of the testing material. For this reason, I prefer a light, filmy application of the testing material to the surfaces of the blades, such an application as is obtained in the other procedures described. A light application affords a more accurate or definite indication, and permits quicker inspection.

I claim as my invention:

1. The method of magnetic testing for flaws the blades of a turbine rotor, which comprises establishing a concentration of radially extending lines of magnetic flux in said blades, and subjecting the magnetized blades in succession angularly of said rotor to a dispersion of magnetic testing material, whereby the distribution of the testing material attracted to the surfaces of the blades will reveal the defects in individual blades.

2. The method of magnetic testing for flaws the blades of a turbine rotor, which comprises maintaining a concentration of radially extending lines of magnetic flux in said blades, and applying magnetic testing material upon the surfaces of said blades, whereby the distribution of the testing material upon such surfaces will reveal the defects in individual blades.

3. The method of magnetic testing for flaws the blades of a turbine rotor, which comprises maintaining a concentration of radially extending lines of magnetic flux in said blades, rotating said rotor and applying magnetic testing material progressively to the surfaces of such magnetized blades, whereby the distribution of the applied material will reveal the defects in individual blades.

4. The method of magnetic testing for flaws the blades of a turbine rotor, which comprises maintaining a concentration of radially extending lines of magnetic flux in said blades, providing a dispersion of magnetic testing material, and by rotating said rotor subjecting the magnetized blades in succession to said dispersion, whereby the distribution of magnetic testing material upon the surfaces of the blades will reveal the defects in individual blades.

5. The method of magnetic testing for flaws the blades of a turbine rotor, which comprises maintaining a concentration of radially extending lines of magnetic flux in said blades, providing a cloud of magnetic testing material, and subjecting said blades in succession to the testing material in said state, whereby the distribution of the testing material attracted to the surfaces of said blades will reveal the defects in individual blades.

6. In apparatus for the magnetic testing of the blades of a turbine rotor, the combination of means for rotatably supporting said rotor, means for producing a concentration of radial lines of magnetic flux in said blades, and means for applying magnetic testing material to the surfaces of the magnetized blades.

7. In apparatus for the magnetic testing of the blades of a turbine rotor, the combination of means for rotatably supporting said rotor, means for producing a concentration of radial lines of magnetic flux in said blades, and means for providing a dispersion of magnetic testing material adjacent the surfaces of the magnetized blades.

FRANK C. JACOBS.